United States Patent

Moriyama et al.

[15] 3,653,121

[45] Apr. 4, 1972

[54] METHOD FOR MANUFACTURING A MEMORY PLANE

[72] Inventors: Hiromi Moriyama, Fujisawa-shi; Susumu Hibi, Yokohama, both of Japan

[73] Assignee: Hitachi, Ltd., Tokyo, Japan

[22] Filed: Jan. 26, 1970

[21] Appl. No.: 5,856

[30] Foreign Application Priority Data

Jan. 27, 1969 Japan....................................44/5260

[52] U.S. Cl.....................29/604, 340/174 PW, 340/174 JA, 340/174 VA

[51] Int. Cl.........................................................H01f 7/06

[58] Field of Search................29/604; 340/174 PW, 174 JA, 340/174 VA

[56] References Cited

UNITED STATES PATENTS 3,465,432 9/1969 Crimmins et al.........................29/604

*Primary Examiner*—John F. Campbell
*Assistant Examiner*—Carl E. Hall
*Attorney*—Craig, Antonelli, Stewart & Hill

[57] ABSTRACT

A method for manufacturing a memory plane including thin film magnetic wires, wherein moulding core wires embedded in an insulating sheet structure in a preceding stage are removed from the sheet structure in such a manner as to rip open the wall between one side of the structure and the moulding core wires such that said insulating sheet structure is formed with slots for accommodating the thin film magnetic wires therein.

2 Claims, 7 Drawing Figures

INVENTORS

HIROMI MORIYAMA and SUSUMU HIBI

BY Craig, Antonelli, Stewart & Hill
ATTORNEYS

INVENTORS

HIROMI MORIYAMA and SUSUMU HIBI

BY Craig, Antonelli, Stewart & Hill

ATTORNEYS

METHOD FOR MANUFACTURING A MEMORY PLANE

The present invention relates generally to a method for manufacturing memory planes and more particularly to wire memory planes employing thin film magnetic wires.

Various methods of preparing wire memory planes are already known to the prior art, in which thin film magnetic wires (hereinafter simply referred to as magnetic wires) composed of small diameter conductor cores such as copper wires, phospher-bronze wires and the like and each having coated thereon a thin magnetic film of permalloy or the like, are arranged in juxtaposition and then word drive wires are disposed to cross the magnetic wires at right angles such that a memory element is formed at each intersection of these wires. What is disclosed in Japanese Pat. Publication No. 7653/68 relates to a method of preparing one form of this kind of memory planes. Generally, since fine magnetic wires are used in these wire memory planes and since their magnetic characteristics are subject to deterioration due to stress exerted on the wires, such wire memory planes must be manufactured with care so that stress will not be exerted on the magnetic wires as far as possible. It is also necessary to arrange so that when a fault occurs in any memory element, the related magnetic wire may be readily replaced with a new magnetic wire; and at the same time such wire memory planes should preferably permit a high packaging density of the magnetic wires and low production cost. It is especially necessary that the method of manufacturing them is simplified and the uniform quality is assured. The method for manufacturing a memory plane disclosed in the previously mentioned Japanese Pat. Publication No. 7653/68 will now be described briefly. In fact, this prior art method comprises the steps of: sandwiching a plurality of moulding core wires having a small diameter between two sheets of insulation; bonding said two sheets of insulation together and removing said moulding core wires from said bonded sheets of insulation to form a plurality of cavities; and inserting magnetic wires having a diameter smaller than that of said cavities into said cavities in juxtaposition and perpendicular to a plurality of work drive lines. In FIG. 1, there is shown a bonded sheet structure 12 of insulation having cavities 10 and 11 into which magnetic wires 13 and 14 are inserted. A memory plane manufactured in this manner satisfies in many respects the previously mentioned structural requirements of a good memory plane. However, one of the steps in this method, that is, the step of removing the moulding core wires from the bonded sheets of insulation to form a plurality of cavities gives rise to various problems and memory planes cannot easily be manufactured. In other words, the moulding core wires embedded in the bonded sheets of insulation are securely held over their length in the bonded sheets of insulation so that these moulding core wires cannot be withdrawn under the normal conditions. It is thus necessary to resort to some means or others which will facilitate the removal of the wires, such as preheating the wires before their removal or using moulding core wires having a specifically treated surface. Moreover, even if the recourse to these procedures were made, it is impossible to produce long sheet products since the diameters of moulding core wires used are small and thus they are likely to be easily broken. Furthermore, it is required to use such a moulding core wire as a stainless wire having a good tensile strength with the result that it is not easy matter to bond two sheets of insulation together without producing any warping wrinkles while juxtaposing the wires in accurately spaced relation.

The present invention contemplates to eliminate these drawbacks of the prior art and has for its object the provision of a method for manufacturing a memory plane comprising the steps of forming a plurality of slots of a specially designed configuration and securely placing magnetic wires into these slots, and this contrasts with the conventional method of manufacture in which the moulding core wires are removed to form a plurality of cavities.

Other objects, features and advantages will be apparent from the following detailed descriptions of the embodiments according to the present invention taken in conjunction with the accompanying drawings in which:

FIG. 1 is a perspective view showing a portion of a prior art memory plane;

FIG. 2*a* is a sectional view showing the relative relations between the two sheets of insulation and the thin film magnetic wires in an embodiment according to the present invention;

FIG. 2*b* is a sectional view of a laminated sheet structure formed by bonding two sheets of insulation together in the arrangement as shown in FIG. 2*a*;

The method for manufacturing a memory plane according to the present invention will be explained hereinafter.

Figure 1:
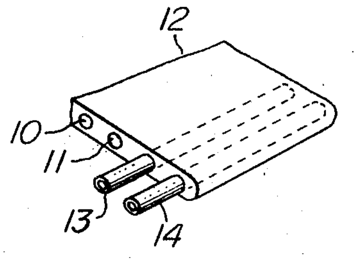
Figure 2A:
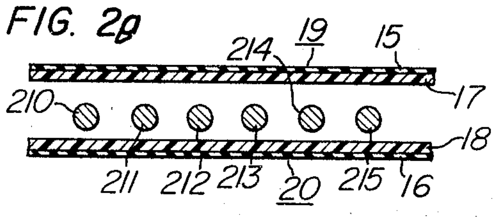
Figure 2B:
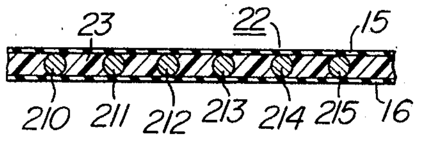

FIG. 2*a* is a sectional view showing insulating sheets 19 and 20 composed of insulating layers 15 and 16 having thermoplastic plastic layers 17 and 18 coated thereon and moulding core wires 210, 211, 212 —, which are arranged in juxtaposition. FIG. 2*b* is a sectional view showing in section a laminated sheet structure 22 formed by a thermal pressure bonding, and the moulding core wires 210, 211, 212 — are embedded within a bonded plastic layer 23. The diameter of the wires 210, 211, 212 — is selected to be slightly larger than the diameter of a magnetic wire. The thickness of the plastic layer is substantially the same with the diameter of the moulding core wire, and the thickness of the insulating layers is thin as compared to the diameter of the wires 210 etc. The tensile strength of the wires 210 etc., needs not be so large, and thus soft copper wires, for example, may be used as the moulding core wires. A laminated sheet structure embedding soft copper wires can be manufactured with a particular easiness. The manner showing how a magnetic wire supporting sheet structure can be prepared from the said laminated sheet structure will now be explained with reference to FIG. 3.

Figure 3:
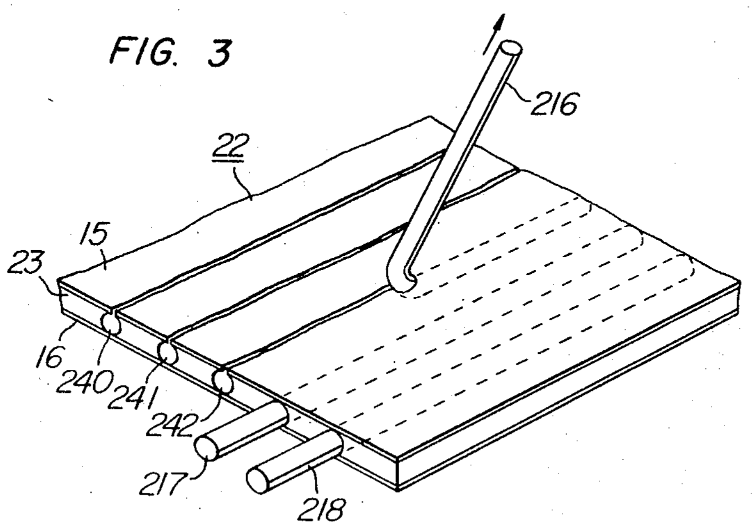
FIG. 3 is an explanatory view showing the manner in which moulding core wires are removed from the sheet structure to form slots.

Referring to FIG. 3, if, for example, the wire 216 of the wires 216, 217 and 218 embedded in the laminated sheet structure 22 is pulled up at a suitable angle with the surface of the laminated sheet structure 22, the wire 216 is removed from the laminated sheet structure 22 breaking the insulating layer 15 and a portion of the plastic layer 23 and a slot 242 is formed at the former location of the wire 216. The torn openings of the thus formed slots 240, 241, 242, — return to their original states by virtue of the elasticity of the plastic layer 23 and the insulating layer 15 and thus almost no apparent openings will be left. In this manner, the wires 216, 217, 218, — can be very easily removed from the laminated sheet structure 22 and there is no need to heat these wires for their removal. Since the force required to remove the wires 216 etc. needs not to be so large, soft copper wires and the like may be used as the moulding core wires. Moreover, since the force required to remove the wires is constant irrespective of the length of the wires, there will be no limit to the length of magnetic wire supporting sheets that can be manufactured according to the method of the present invention.

Figure 4:
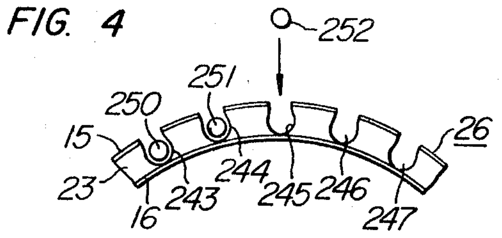
FIG. 4 is an explanatory view showing a method of placing thin film magnetic wires into the slots of the magnetic wire supporting sheet structure.

In the next step, magnetic wires will be placed into the slots of the magnetic wire supporting sheet structure. The inside of each slot is made very smooth and therefore a magnetic wire may be easily forced into the slot from one end of the slot. Furthermore, if the magnetic wire supporting sheet structure 26 is bent as shown in FIG. 4, the torn openings of the slots 243, 244, 246, 247, — will be caused to widen so that magnetic wires 250, 251, 252, — may be inserted into the slots along their torn openings at a stretch. The magnetic wires thus inserted may be firmly held within the slots if the bending of the sheet structure 26 is removed returning the sheet structure to its normal flat shape.

Figure 5:
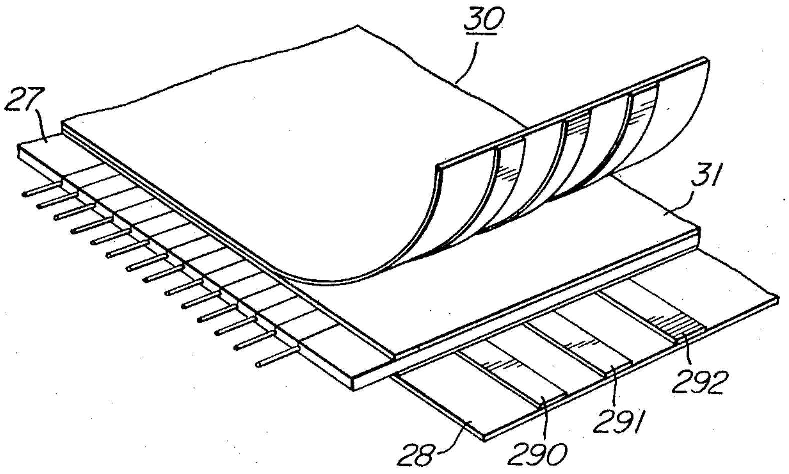
FIG. 5 is a perspective view showing an embodiment of the memory plane according to the present invention.

In FIG. 5 there is shown an embodiment of a wire memory plane incorporating a magnetic sheet structure 27 which is prepared by inserting magnetic wires into a magnetic wire supporting structure made in accordance with the above described method. A work drive cable 30 is adhered on each side of the magnetic sheet structure 27 by means of an intervening layer 31 of adhesive material. The word drive cable 30 is composed of a Myler sheet 28 having a plurality of parallel copper lines 290, 291, 292, — etched out on the surface of the sheet. The copper lines 290, 291, 292, — provide word drive lines and these word lines cross the magnetic wires of the magnetic wire sheet structure 27 at right angles so that a memory element is formed at each intersection of these wires. In other words, when the magnetic wire and the word drive wire are excited in a proper relationship, information will be stored on the magnetic wire at the intersection. Thus, if a read-out pulse is applied solely to the word drive wire, either a positive or negative voltage will be induced on the magnetic wire depending on the information stored on the magnetic wire and the information may be read-out.

The torn openings in the magnetic wire sheet structure 27 are now closed by the combination of the layers 31 of adhesive material and the word drive cables 30 so that the magnetic wires will not be allowed to get out of the magnetic wire sheet structure 27 through the said torn openings, but they will be securely held satisfactorily in the slots of the magnetic wire sheet structure 27. In this case, however, the magnetic wires held in the slots are easily movable in the axial direction. In other words, any fault magnetic wires may easily be replaced even in the memory plane constructed as shown in FIG. 5. This means that the word drive cables 30 may be first bonded to the magnetic wire supporting sheet structure by means of the layers 31 of adhesive material to form a memory plane and then the magnetic wires may be inserted into the slots in the magnetic wire supporting sheet structure to complete the memory plane. As previously mentioned, FIG. 5 illustrates only an embodiment of the memory plane according to the present invention. Thus, it should be evident that the method of the present invention is equally applicable to any other similar memory constructions wherein, for example, the word drive cables 30 are formed by means of bonding, thermal pressure bonding and the like other than the etching. Moreover, even if the etching is used for forming the word drive cables 30, the Myler sheet 28 may readily be replaced by any other insulating films or sheets.

Figure 6:
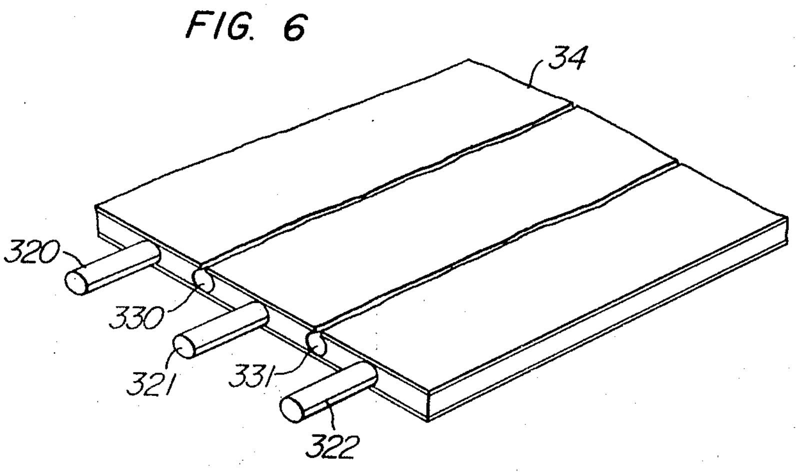
FIG. 6 is a perspective view showing another form of the magnetic wire supporting sheet structure with some of the slot forming wire cores being utilized as return wires.

Still furthermore, conductors such as soft copper wires may be employed for the moulding core wires 210, 211, 212, — shown in FIGS. 2*a* and 2*b* so that in removing these wires as shown in FIG. 3 every second moulding core wire may be left to form a magnetic wire supporting sheet structure 34 as shown in FIG. 6. Slots 330, 331, 332, — which are formed by removing every second moulding core wires in the manner shown in FIG. 3 will receive their respective magnetic wires so that the remaining moulding core wires 320, 321, 322, — may be utilized as return wires. With this magnetic wire supporting sheet 34, a wire memory plane such as shown in FIG. 5 may be constructed in the previously described manner so that the return wires coupled with their adjacent magnetic wires may provide transmission lines for signals and the like.

It is evident from the foregoing that according to the method of the present invention, sheet structures for supporting magnetic wires can be very easily manufactured and moreover extremely long sheet structures of this kind can also be manufactured easily. Furthermore, automatic continuous production processes enable the production of the magnetic wire supporting sheet structures which are quite inexpensive and uniform in quality. The sheet structure thus manufactured will be formed with slots having a smooth internal surface so that the insertion of magnetic wires as well as the replacement of fault magnetic wires may be readily effected. Besides, the utilization of the torn openings of the slots in the magnetic wire supporting sheet structure makes it easier to securely hold the magnetic wires in the slots. If conductors are used for the slot forming core wires, some of these wires may be left so as to utilize them as the return wires.

What is claimed is:

1. A method for manufacturing a memory plane characterized by the steps of: forming a laminated sheet structure by interposing moulding core wires between two insulating sheets, each of said moulding core wires having a diameter slightly larger than the diameter of a magnetic wire; removing said moulding core wires by tearing from one side of said laminated sheet structure parallel to the length of said moulding core wires and inserting said magnetic wires into the thus formed slots to thereby provide a magnetic wire sheet structure; and juxtaposing a plurality of word drive wires on both sides of said magnetic wire sheet structure so that said plurality of word drive wires make a right angle with said magnetic wires inserted into said slots.

2. A method for manufacturing a memory plane characterized by the steps of: forming a laminated sheet structure by interposing moulding core wires between two insulating sheets, said moulding core wires consisting of conductors each thereof having a diameter slightly larger than the diameter of a magnetic wire; leaving selected ones among said moulding core wires in said laminated sheet structure in the embedded state and removing the other of said moulding core wires by tearing from one side of said laminated sheet structure parallel to the length of said moulding core wires and inserting said magnetic wires into the thus formed slots to thereby provide a magnetic wire sheet structure; and juxtaposing a plurality of word drive wires on both sides of said magnetic wire sheet structure, said plurality of word drive wires making a right angle with said magnetic wires inserted in said slots.

* * * * *